United States Patent [19]

Jaquiss et al.

[11] 3,897,391

[45] July 29, 1975

[54] PROCESS FOR PREPARING POLYCARBONATE

[75] Inventors: Donald B. G. Jaquiss, New Harmony; Howard E. Munro, Evansville, both of Ind.

[73] Assignee: General Electric Company, Pittsfield, Mass.

[22] Filed: Sept. 28, 1973

[21] Appl. No.: 401,938

Related U.S. Application Data

[63] Continuation-in-part of Ser. No. 194,509, Nov. 1, 1971, abandoned.

[52] U.S. Cl.... 260/47 XA; 260/45.7 P; 260/77.5 D; 260/860
[51] Int. Cl....................... C08g 17/13; C08g 51/58
[58] Field of Search.................... 260/47 XA, 45.7 P

[56] References Cited
UNITED STATES PATENTS

| | | | |
|---|---|---|---|
| 3,201,369 | 8/1965 | Dell et al. | 260/47 X A |
| 3,475,372 | 10/1969 | Gable | 260/47 X A |
| 3,578,634 | 5/1971 | Bialous et al. | 260/47 X A |

*Primary Examiner*—Wilbert J. Briggs, Sr.
*Attorney, Agent, or Firm*—Donald M. Papuga; William F. Mufatti

[57] ABSTRACT

An improved process for preparing an aromatic polycarbonate, which improvement comprises carrying out the reaction in the presence of a minor amount of a particular hypophosphite such as alkali earth metal or alkali metal hypophosphite and, in particular, sodium hypophosphite. The mere employing of the particular additive in the reaction medium results in a polycarbonate having improved resistance to thermal degradation.

7 Claims, No Drawings

PROCESS FOR PREPARING POLYCARBONATE

This application is a continuation-in-part of application Ser. No. 194,509, filed Nov. 1, 1971, and now abandoned.

This invention relates to an improved process for preparing an aromatic polycarbonate resin having improved resistance to thermal degradation when exposed to elevated temperatures. The improvement comprises carrying out the reaction of a dihydric phenol and a carbonate precursor in the presence of a hypophosphite.

BACKGROUND OF THE INVENTION

Aromatic polycarbonate resins are well known in the art and are considered as one of the toughest thermoplastics (high impact strength) in the industry today. Polycarbonate resins have a high heat distortion temperature and as such they are attractive for use in many applications heretofore not available to thermoplastics. In addition, polycarbonate resins, also offer high impact resistance when molded into desired shapes.

Unfortunately, however, when polycarbonate resin molded articles are continually exposed to elevated temperatures, thermal degradation of the polycarbonate occurs. This results in loss of toughness (impact strength), loss of gloss and discoloration of water clear polycarbonate articles. The use of various additives have been employed to increase resistance of polycarbonate resin to thermal degradation. These additives either require removal in a final additional process step or are allowed to remain in the resin. Either approach is not considered desirable from the economics of an additional process step or from the side effects that can occur by leaving the additive in the resin.

DESCRIPTION OF THE INVENTION

It has now been surprisingly discovered that by employing a particular additive in the reaction medium during the condensation reaction of a dihydric phenol and a carbonate precursor to produce an aromatic polycarbonate, a polycarbonate is obtained having improved resistance to thermal degradation when exposed to elevated temperatures. The surprising feature is that not only does the additive result in an improved polycarbonate but the additive does not remain in the resin but is washed out when the polymer solution is washed. The mere addition of the additive to the reaction medium results in producing a polycarbonate having improved properties.

More specifically, the instant invention is directed to an improved process for preparing a phosphite-free polycarbonate resin. The improvement comprises carrying out the reaction for preparing an aromatic polycarbonate, which involves the condensation reaction of a dihydric phenol with a carbonate precursor in the presence of an inert organic solvent for the polycarbonate in the presence of an alkali earth metal or an alkali metal hypophosphite. The hyphosphite employed herein must be present in an amount of 0.01 – 5.0 weight % based on the weight of the dihydric phenol. The preferred hypophosphite is sodium hypophosphite.

DESCRIPTION OF THE PREFERRED EMBODIMENT

The examples set forth herein are to illustrate in more detail the preferred embodiment and to illustrate more clearly the principle and practice of this invention to those skilled in the art.

EXAMPLE I

A slurry of bisphenol-A (2,2-bis(4-hydroxyphenyl)-propane) (57.1 g.), calcium hydroxide (59.2 g.), methylene chloride (500 ml.), p-t-butylphenol (1.0 g.) and triethylamine (0.030 ml.) is phosgenated for 45 minutes at the rate of 0.6 g. phosgene/minute with vigorous agitation. After an additional minute of stirring, water (10 ml.) is added followed by Celite (2 g.). Separation of the resin solution from the sludge by filtration followed by precipitation into methanol gave a polymer having an intrinsic viscosity of 0.53 dl./g. as determined in dioxane at 30°C.

EXAMPLE II

Example I is repeated except that after 34 minutes of phosgenation, sodium hypophosphite (24 mg.) is added to the reaction. Phosgenation is then continued for an additional 11 minutes at the rate of 0.6 gms./minute. A polymer is obtained having an intrinsic viscosity of 0.53 dl/gram.

EXAMPLE III

Samples of Examples I and II above are placed in an air circulating oven at 140°C for 7 days. The color of each sample and the effect of heat on thermal discoloration is determined by comparison of solutions of the samples (3.5 grams in 25 ml. of methylene chloride) with the American Public Health Association (APHA) water color standard. The higher the number, the greater is the discoloration. The results are as follows:

| Sample | APHA |
|---|---|
| Example I (no sodium hypophosphite) | 219 |
| Example II (sodium hypophosphite) | 109 |

EXAMPLE IV

A mixture of bisphenol-A (76 g.), p-t-butylphenol (1.73 g.), triethylamine (0.46 ml.), methylene chloride (301 ml.) and water (76 ml.) is phosgenated at a rate of 0.94 g/min. for a total of 38 minutes. The pH is maintained at 9.0 for the first 30 minutes and thereafter at 11.0 by addition of 15% aqueous sodium hydroxide solution. After the phosgenation is completed, the system is stirred for 10 minutes. The phases are separated and the polymer solution is washed with (N/100) aqueous sodium hydroxide, (N/100) HCl and finally with water. The polymer is recovered by precipitation with methanol and had an intrinsic viscosity of 0.49 dl/g.

EXAMPLE V

Example IV is repeated except that 0.076 g. of sodium hypophosphite is added to the reaction medium with the initial reactants. The polymer is recovered as in Example IV and is found to have an intrinsic viscosity of 0.52 dl/g.

EXAMPLE VI

Three and one-half (3.5) grams of each of the compositions of Examples IV and V are placed in an open combustion tube and heated in an aluminum block at 600°F. for 15 minutes. The tubes are then cooled and the contents thereof dissolved in 25 ml. of distilled methylene chloride. The percent light transmission through the solutions is measured against the percent light transmission through distilled methylene chloride at 425 manometers. The higher the transmission, the lower is the discoloration of the polymer which in turn means better thermal stability of the polymer to thermal discoloration. The results are as follows:

| Sample | % Transmission |
|---|---|
| Example IV (no sodium hypophosphite) | 89.5 |
| Example V (sodium hypophosphite) | 93.7 |

EXAMPLE VII

A mixture of 2,2-bis(4-hydroxyphenyl) propane (16 lbs.), 2,2-(3,3',5,5'-tetrabromo-4,4'-dihydroxydiphenyl) propane (16 lbs.,)., water (50 lbs.), methylene chloride (10 gallons), triethylamine (192 ml.) and p-t-butylphenol (210 g.) is phosgenated at a rate of 14 lbs./hr. for 37 minutes while maintaining a pH at 9.0 by addition of 50% aqueous sodium hydroxide. The pH is then adjusted and maintained at 12.5 for the next 13 minutes with the phosgene rate reduced to 7.1 lbs./hr. The phases formed are separated; the polymer solution is washed with caustic, hydrochloric acid and water. The recovered polymer has an intrinsic viscosity of 0.36 dl./g/ as determined in dioxane at 30°C.

EXAMPLE VIII

Example VII is repeated except that sodium hypophosphite (14.5 g.) is added to the formulation. The polymer so obtained is recovered in the same manner as in Example VII and is found to have an intrinsic viscosity of 0.36 dl./g.

EXAMPLE IX

The samples of Examples VII and VIII are evaluated for light transmission using the same procedure in Example VI. The results are as follows:

| Sample | % Transmission |
|---|---|
| Example VII | 64.7% |
| Example VIII | 84.4% |

As shown in the examples, the mere carrying out of the reaction in the presence of the particular hypophosphite results in an aromatic polycarbonate having improved resistance to thermal degradation at elevated temperatures. The hypophosphite does not remain in the polymer but is washed out when the polymer solution is washed. The reaction mechanism is not fully understood, but it is believed that the hypophosphite acts as a reducing agent. The use of these particular hypophosphites offers the ability to produce this type of polycarbonate without the need for external additives as shown in the prior art to obtain such results.

As stated previously, the particular hypophosphite employed herein is selected from the group consisting of the alkali earth metal or alkali metal hypophosphites. It is also interesting to note that the additive must be present in an amount of 0.01 – 5.0 weight %. In addition, the reaction may be carried out in a reaction medium consisting of an aqueous alkaline solution having a pH of 6–14 and an inert organic solvent. The hypophosphites employed herein in place of those used in the examples with essentially the same results are lithium hypophosphite, potassium hypophosphite, barium hypophosphite, magnesium hypophosphite and hypophosphorus acid.

The aromatic carbonate polymers employed in the practice of this invention are carbonate homopolymers of dihydric phenols, carbonate copolymers of two different dihydric phenols or copolymers of such dihydric phenols with glycols, e.g., ethylene glycol or propylene glycol, dibasic acids, e.g. isophthalic acid or terephthalic acid, or hydroxyl or acid-terminated polyesters, e.g., hydroxyl or acid terminated polyesters or neopentyl glycol and adipic acid and include those disclosed in U.S. Pat. Nos. 3,030,331 and 3,169,121 which are hereby incorporated by reference. Such aromatic carbonate polymers are prepared by reacting a dihydric phenol with a carbonate precursor which may be either a carbonyl halide, e.g., as carbonyl chloride, carbonyl bromide and carbonyl fluoride or a haloformate, e.g., bishaloformates of dihydroxy aromatic compounds (bischloroformates of hydroquinone, etc.) or glycols (bishaloformates of ethylene glycol, neopentyl glycol, propylene glycol, etc.). Preferably, phosgene is employed to prepare the aromatic carbonate polymers employes in the practice of this invention.

In general, the dihydric phenols which can be employed in place of the 2,2-bis-(4-hydroxyphenyl) propane used in the examples to prepare the aromatic carbonate polymers are mononuclear or polynuclear aromatic compounds, containing as functional groups, two hydroxyl radicals, each of which is attached directly to a carbon atom of an aromatic nucleus and are hydroquinone, resorcinol, bis(4-hydroxyphenyl) methane, 2,2-bis(4-hydroxy-3-methylphenyl) propane, 4,4-bis(4-hydroxyphenyl) heptane, 2,2-(3,3', 5,5'-tetrachloro-4,4'-dihydroxydiphenyl) propane, 2,2-(3,3', 5,5'-tetrabromo-4,4'-dihydroxy-diphenyl) propane and 3,3'-dichloro-4,4'-dihydroxydiphenyl methane. Other dihydric phenols are also available and are disclosed in U.S. Pat. Nos. 2,999,835, 3,028,365 and 3,334,154 which are incorporated herein by reference. As stated previously, it is, of course, possible to employ two or more different dihydric phenols or a copolymer of a dihydric phenol with a glycol, a hydroxy or an acid-terminated polyester, or a dibasic acid in the event a carbonate copolymer rather than a homopolymer is desired for use in the preparation of the novel aromatic carbonate polymers of this invention.

The method for preparing the aromatic carbonate polymers of this invention, when employing phosgene, involves passing phosgene into a reaction mixture containing a dihydric phenol, for example, and an acid acceptor. The acid acceptor may be used undiluted or diluted with inert organic solvents as, for example, methylene chloride, chlorobenzene, or 1,2 dichloroethane. Tertiary amines are advantageous since they are good solvents as well as acid acceptors during the reaction.

The temperature at which the phosgenation reaction proceeds may vary from below 0°C. to above 100°C. The reaction proceeds satisfactorily at temperatures from room temperature (25°C.) to 50°C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the polycarbonate resin of the invention comprises adding phosgene to an alkaline aqueous solution of the dihydroxy aromatic compound used. This is preferably done in the presence of inert solvents such as methylene chloride, 1,2 dichloroethane and the like. When carrying out this reaction, the hypophosphite is preferably soluble in the aqueous phase. In addition, the pH of the alkaline aqueous solution should be between 6-14.

Still another method for preparing such carbonate polymers involves the phosgenation of an agitated suspension of an alkaline earth metal hydroxide and a dihydric phenol used in a non-aqueous medium such as chlorobenzene, methylene chloride, ethylene dichloride, etc. This reaction is illustrated by the addition of phosgene to a slurry of calcium hydroxide and 2,2 bis-(4-hydroxyphenyl)-propane in an inert polymer solvent such as chlorobenzene. The organic solvent should preferably be a polymer solvent but need not necessarily be a good solvent for the reactants. This process is described in U.S. Pat. No. 3,290,409 which reference is incorporated herein by reference.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What is claimed is:

1. In a process for the manufacture of an improved aromatic polycarbonate by reacting a dihydric phenol with a carbonate precursor, the improvement comprising carrying out the reaction in the presence of 0.01 – 5.0 weight % of a hypophosphite selected from the group consisting of alkali earth metal hypophosphites and alkali metal hypophosphites; said weight % being based on the weight of the dihydric phenol employed in the reaction.

2. The process of claim 1 wherein the reaction is carried out in a reaction medium consisting of an aqueous alkaline solution having a pH of 6–14 and an inert organic solvent.

3. The process of claim 1 wherein the hypophosphite is sodium hypophosphite.

4. The process of claim 2 wherein the pH of the aqueous alkaline solution is 9–13.

5. The process of claim 2 wherein the inert organic solvent is methylene chloride.

6. The process of claim 1 wherein the carbonate precursor is phosgene.

7. The process of claim 1 wherein the dihydric phenol is 2,2-bis(4-hydroxyphenyl) propane.

* * * * *